Aug. 27, 1963

R. B. TAYLOR ETAL

3,101,607

APPARATUS FOR AND METHOD OF TESTING WIND
INSTRUMENTS FOR LEAKAGE

Filed June 21, 1961

INVENTORS
Robert B. Taylor
Robert G. Walker
BY

ATTORNEYS

United States Patent Office
3,101,607
Patented Aug. 27, 1963

3,101,607
APPARATUS FOR AND METHOD OF TESTING WIND INSTRUMENTS FOR LEAKAGE
Robert B. Taylor and Robert G. Walker, Fort Wayne, Ind., assignors to H. & A. Selmer, Inc., Elkhart, Ind., a corporation of Indiana
Filed June 21, 1961, Ser. No. 118,592
13 Claims. (Cl. 73—40)

This invention relates to improvements in apparatus for and a method of testing wind instruments for leakage, the invention being highly desirable for testing musical instruments, complete or section by section, and while highly desirable for testing woodwind instruments, is also practical for the testing of mouthpieces and complete metal instruments or sections thereof to determine whether or not there is any leakage of air, particularly at the valves, keys, tone hole covers, etc., although the invention may have other uses and purposes as will be apparent to one skilled in the art.

In the past, considerable difficulty has been experienced in testing musical instruments of the so-called wind variety for leakage, and this was particularly true in connection with those instruments having both normally open and normally closed tone holes. In many cases such testing was endeavored manually. Insofar as we are aware, no really satisfactory, yet rapid and economic apparatus for or method of testing wind instruments has been heretofore provided.

Accordingly, it is an important object of the instant invention to provide apparatus for the quick, economical, and accurate testing of a wind instrument, section or part thereof, for leakage.

Also an object of this invention is the provision of testing apparatus for use with a wind instrument, section or part thereof, and which denotes not only if there is a leak, but also shows the relative amount of leakage.

Another feature of the invention resides in the provision of testing apparatus for wind instruments and parts thereof, by the use of which any leakage may be quickly and accurately located.

Still another object of the invention is the provision of apparatus for testing wind instruments or parts thereof for leakage, which apparatus may be very quickly and easily calibrated, adjusted, or parts interchanged for use with instruments of different sizes.

It is a further object of the instant invention to provide apparatus whereby a wind instrument or section thereof may be tested for leakage, the apparatus being so constructed that that portion of the instrument or section having tone holes or keys governed by one hand during the playing of the instrument may be tested at a time, and then another similar portion tested, whereby the operator always has one hand free to manipulate keys or tone hole covers individually and thereby ascertain the exact location of any leakage.

It is also an object of this invention to provide a new and novel method of testing wind instruments and parts thereof for leakage.

While some of the more salient features, characteristics and advantages of the instant invention have been above pointed out, others will become apparent from the following disclosures, taken in conjunction with the accompanying drawings, in which.

As shown on the drawings.

The apparatus embodied in the instant invention may be assembled in various arrangements, depending upon whether it is permanently mounted, of the portable type, or depending upon available space and other circumstances. Therefore, we have illustrated the apparatus generally diagrammatically in FIGURE 1 of the drawings with an arrangement that may be mounted upon a suitable backboard, or the like. With test apparatus of this character it is preferable to have a different size and often times a different style of adaptor for each different size and style of instrument body or section to be tested. In large factory installations where numerous kinds and sizes of wind instruments are continuously being made, testing apparatus with an entire series of such adaptors permanently mounted in position may be desired. On the other hand, with smaller installations and particularly with portable testing apparatus mounting means permitting the quick and facile substitution of one adaptor for another is more desirable than a series of permanently mounted adaptors, and for specific illustration herein we have selected the structure which permits a rapid interchanging of adaptors.

Figures 1, 1A:
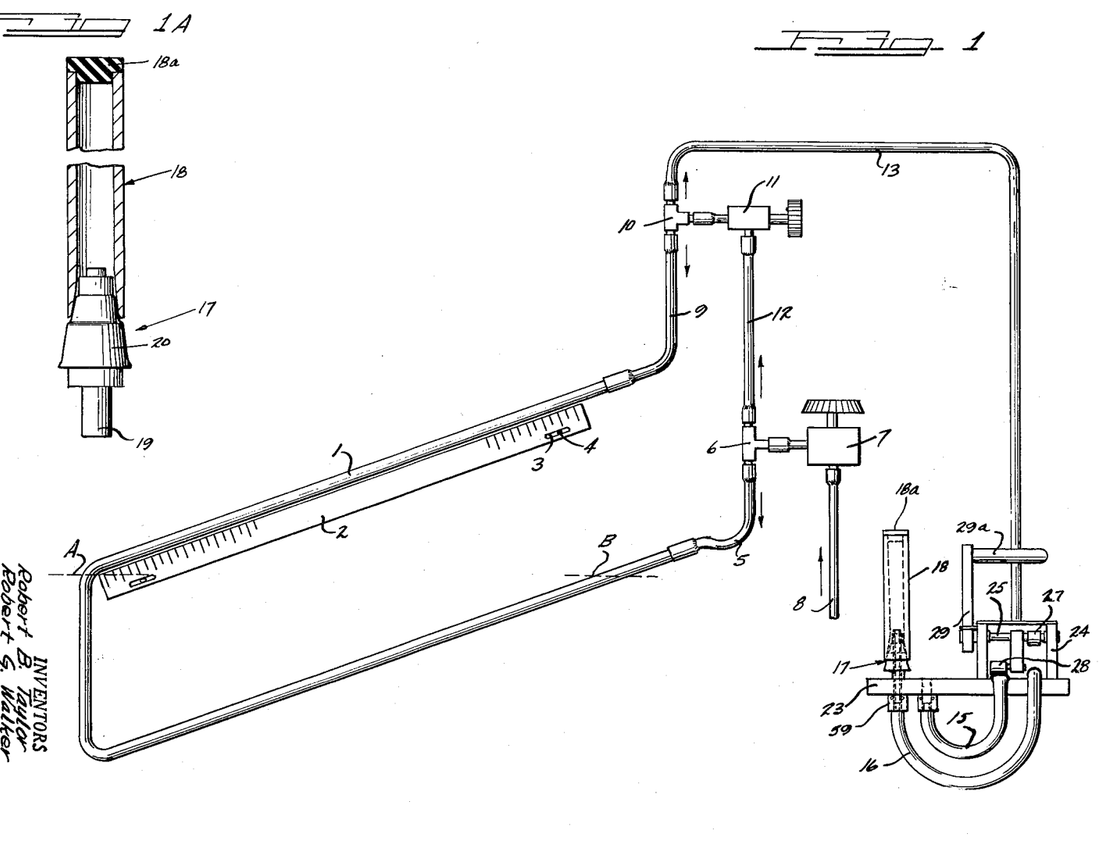
FIGURE 1 is a fragmentary, somewhat diagrammatic, elevational view of testing apparatus embodying principles of the instant invention.
FIGURE 1a is an enlarged part sectional part elevational view of a simple form of adaptor with a testpiece thereon as seen in the lower right-hand portion of FIGURE 1.

With reference now to FIGURE 1, it will be seen that the illustrated embodiment of the instant invention includes a generally U-shaped manometer tube 1 of glass, plastic, or other transparent material. This manometer tube is preferably inclined, in a general range of 20° to the horizontal, to enable more accurate determination and reading of minute changes in air pressure acting upon the liquid inside the tube. Water is one satisfactory liquid because of its substantially constant specific gravity, its low viscosity, and because of its generally uniformly standard character, comparable readings may be obtained on separate instruments. Certain other liquids might equally as well be utilized as long as the same liquid is used in all testing apparatus manometers, but water is economical and satisfactory. At the start, the tube is preferably filled with the indicating liquid to the level indicated by dotted lines A and B.

Adjacent to and extending along the upper leg of the tube 1 is a scale 2, which may satisfactorily be graduated in millimeters, and which is retained in position by virtue of an elongated slot 3 at each end thereof and a simple screw 4 passing through each such slot. With that construction, should there be any variation in the liquid level due to evaporation or some other cause, it is a simple expedient to move the scale relatively to the tube 1 until the liquid level at point A coincides with the zero reading on the scale, the screws providing the right amount of friction for this purpose.

The lower leg of the manometer tube 1 is connected by way of a tube 5, a T 6, and a pressure regulating valve 7 to a compressed air supply line 8. All of the various pipes or tubing between connection points are preferably flexible or bendable and may satisfactorily be made of rubber, synthetic rubber, plastic or other suitable substances whereby quick slip-over connections that are airtight may readily be made. The other leg of the manometer tube is connected by way of a tube 9, a T 10, a valve or controllable orifice 11, and a tube 12 to the other side of the aforesaid T 6 and thus to the same compressed air supply line 8. The other leg of the T 10 is connected by way of a tube 13 and a T 14 seen in FIGURE 2 for connection to the instrument or section thereof undergoing test.

Preferably the air supply line 8 is of relatively great capacity so that any air lost through a leakage in an instrument being tested amounts to only a very small portion of the available air supply. A number of testing apparatuses can then be connected to a single air supply, provided that the combined demand of all the test arrangements amounts to only a portion of the total supply of air, so that the operation of a plurality of test arrangements, singly or in multiple, will not cause any noticeable error in the readings of the manometers.

The air pressure in the supply line 8 may be regulated at the source to a pressure between one and ten pounds per square inch as a satisfactory working value, and the valve 7 is a highly accurate final regulating valve which further reduces the pressure in the tubes 5 and 12 and maintains that pressure accurately at a satisfactory working value for the individual apparatus, which may be in the neighborhood of a 7.5 inch column of water.

The valve 11 is a volume reduction valve, a needle valve being satisfactory, and is capable of providing and retaining relatively minute adjustments accurately. It is in effect an adjustable orifice and controls the volume of air reaching the T 10 and passing in one direction through tube 9 to the upper leg of the manometer, and in the other direction through tube 13 to the test piece.

Since air line 8 supplies more air than needed for testing, it would not be practical to measure leakage of most instrument bodies or sections without any restriction at orifice or valve 11, because the manometer would give substantially the same reading of approximately zero regardless of leakage through tube 13 and an instrument part connected thereto. Therefore, the valve 11 is adjusted to provide a relatively small but controlled volume of air to the T 10, and that volume of air is a small percentage of the air available to the lower manometer leg through tube 5. This insures adequate reduction of pressure on the liquid in the upper manometer leg if there is leakage in the instrument part undergoing testing.

Preferably, a standard is established with which each testing apparatus is compared when first assembled. This may be accomplished by having a number of instruments played by competent musicians, and among those instruments some will be good, some acceptable, and some must be rejected. The adjustable orifice 11 was then manipulated to provide various readings on the manometer scale and a particular reading, for example 10 cm., may be selected as a standard for comparison. A standard orifice then is provided against which each new apparatus is checked by adjusting the valve or orifice 11 until a 10 cm. reading is established when a zero reading would be expected and when with full leakage a reading of 28.5 cm. results. Such a standard is, of course, an arbitrary selection, but a standard of 10 cm. has been found satisfactory for the testing of a majority of instrument parts in the clarinet category, whereas for instruments requiring a much greater or less volume of air another standard might preferably be selected. The selection of such a standard enables the determination of relative values of leakage for the instruments undergoing testing.

When the testing apparatus is in use, the air is left continuously flowing. With both valves 7 and 11 properly adjusted, air from the supply line 8 will enter the manometer tube 1 at both ends thereof through the tubes 5 and 9, but with a lesser volume through tube 9 than is available through tube 5. As long as air exits freely through the line 13 the liquid level in the manometer tube will rise in the upper leg along the scale 2 and a satisfactory reading for freely flowing air is about 28.5 centimeters on the scale. That reading represents a head of water that has been found entirely satisfactory, but it will be understood that the 28.5 centimeter starting reading is arbitrarily selected. Should the manometer tube be inclined to the horizontal with a more acute angle, the length of the upper tube somewhat increased, a higher reading could readily be obtained, and perhaps greater sensitivity. Now should an instrument section or body be connected with the tube 13 so that air will flow into that instrument section or body through either of the tubes 15 or 16, the end of the section plugged, and all of the tone-holes maintained closed by the fingers of the operator, the liquid will drop in the upper leg of the manometer to a lower point that indicates the amount of leakage through the instrument. If there is no leakage whatever, the liquid in the upper leg of the manometer will drop to zero on the scale or to the vicinity of the selected standard. If there is leakage the liquid will drop to some point above the zero or standard reading and that point will indicate the amount of leakage as well as the fact that leakage actually exists. Should leakage be occurring in more than one location, both locations can be determined. Individual manipulation of the tone hole covers or key mechanism of the instrument part so that each hole is in turn forcibly held closed will reveal just which tone hole is not effectively closed, and should the manometer liquid drop only partially toward zero when a leaking point is found, and then further drop when a subsequent point is found, both the leaking points are easily located and the proportional amount of leakage through each designated on the manometer scale.

As stated above, a complete instrument or a section of an instrument may be tested in the apparatus disclosed. For example, a flute would be tested as a complete instrument if it had a one piece body, as would a one-piece body clarinet, but where some instruments come in sections such as most clarinets, some flutes, and other instruments a section at a time may be tested.

Where a single section only functions as the test piece, such as a single clarinet section, that section may be readily mounted upon a simple form of adaptor generally indicated by numeral 17. As shown in FIGURE 1, the clarinet section 18 is seated upon the adaptor and the upper end of the section is plugged with a stopper 18a such as a rubber cork. This simple form of adaptor comprises merely a tube 19 having an enlarged portion against which is the base of a tubular graduated resilient seat 20 for the clarinet section 18 to rest upon, as more fully seen in FIGURE 1a. For a permanent installation, it is only necessary to mount the tube 19 in a suitable location, and connect the air tube 13 directly to it. The single clarinet section 18 may then be placed in airtight engagement with the resilient seat 20, the outer end of the section plugged as mentioned above, and the key mechanism manipulated to close all tone holes, open tone holes being fingered so as to maintain them closed, and any leakage ascertained by the action of the manometer liquid.

Where an instrument section or body has more keys, tone holes, valves, or the like can be controlled with one hand during playing of the instrument, it is more feasible to test at one time only that portion of the instrument body having the tone holes controlled by one hand. In such case, an adaptor is utilized which may be actuated to divide the instrument body as to the admitted air so that only a portion of the body is placed under test at a time. Such arrangement, however, requires two sources of air supply for the adaptor. Therefore, suitable valve means are utilized to selectively control the flow of air through the tubes 15 and 16 leading from the tube 13 to the adaptor.

Figure 2:
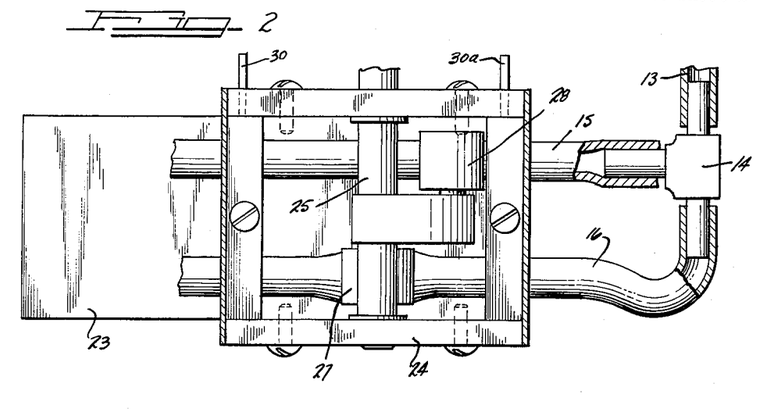
FIGURE 2 is an enlarged fragmentary part sectional and part plan view of the valve means seen in the lower right-hand portion of FIGURE 1, with the valve members in reverse order.
Figure 3:
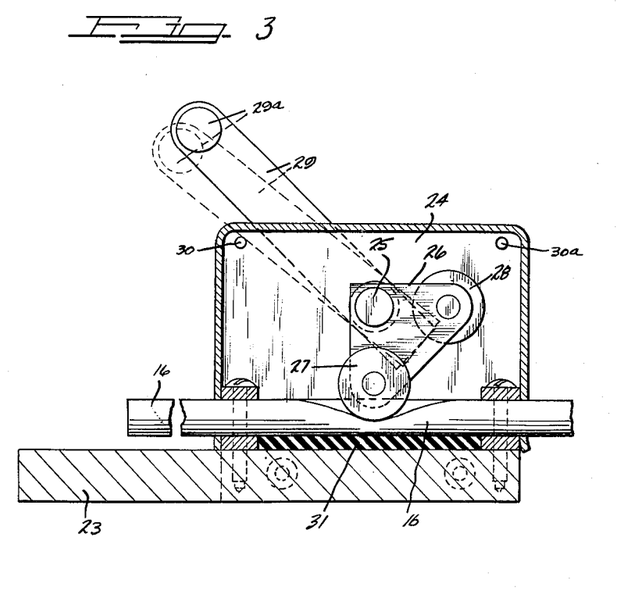
FIGURE 3 is a vertical sectional view through the valve means, with the interior part shown in elevation.

These valve means, rather diagrammatically illustrated in FIGURE 1 and more fully illustrated in FIGURES 2 and 3, may be mounted on the base plate 23 or in any other suitable location. These valve means comprise a frame or casing 24 through which a rotary shaft 25 extends. A triangular piece 26 is affixed near one apex to the shaft for oscillatory movement therewith. On one side thereof adjacent another apex this triangular piece carries a compression roll 27 and another compression roll 28 is mounted on the opposite side of the piece adjacent the remaining apex. The tubes 15 and 16 extend through the frame or casing 24 one beneath each of the rollers 27 and 28. Externally of the frame 24 a lever 29 is connected to the shaft to actuate the same and a transversely extending handle 29a provides ready means for actuating this lever. Stop means 30—30a are provided at opposite ends of the casing 24 near the top thereof to limit movement of the lever. When the lever is pivoted forwardly the roll 27 squeezes the tube 16 against a soft rubber pad 31, compressing the tube and blocking air flow therethrough, as seen clearly in FIGURE 3. When the lever is moved from the full line position to the dotted line position in contact with the stop pin 30, in FIGURE 3, an overcenter condition is established, in that the center of the shaft 25 is slightly to the left of the center of the roller 27, and thus the lever is maintained in position closing the tube 16. The reverse is true when the handle 30 is moved in the opposite direction to lower the roll 28, elevate the roll 27 and block flow through the tube 15, the lever being in overcenter position when it contacts the stop pin 30a. If the lever is left in vertical position, air may flow through both tubes. It will be noted that the valve means are simply, quickly, and positively operated.

Figure 4:
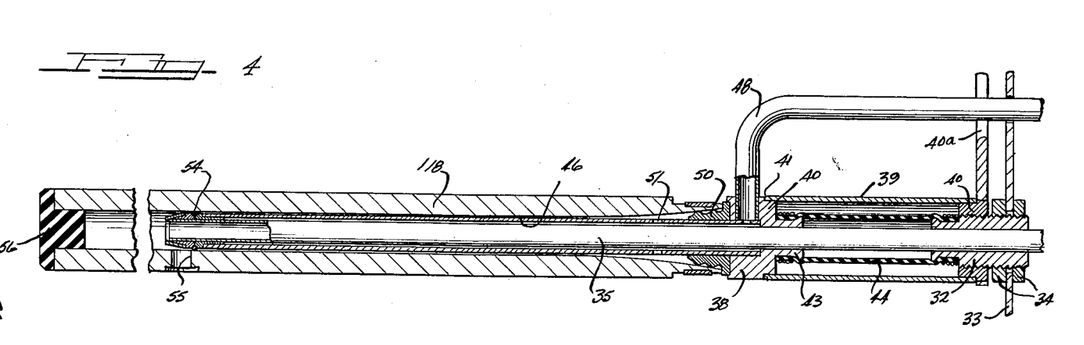
FIGURE 4 is a fragmentary longitudinal sectional view, with parts shown in elevation, of one form of the apparatus or an adaptor on which the instrument or part thereof is mounted during testing.
Figure 5:
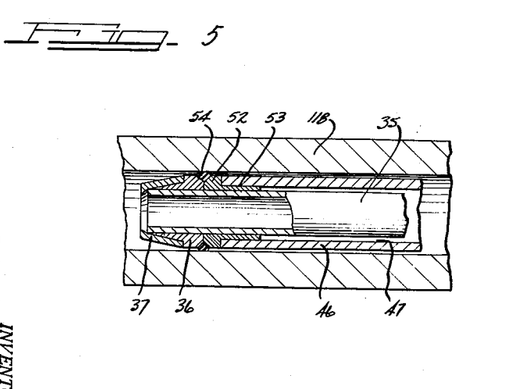
FIGURE 5 is a fragmentary enlargement of the left-hand portion of FIGURE 4.
Figure 6:
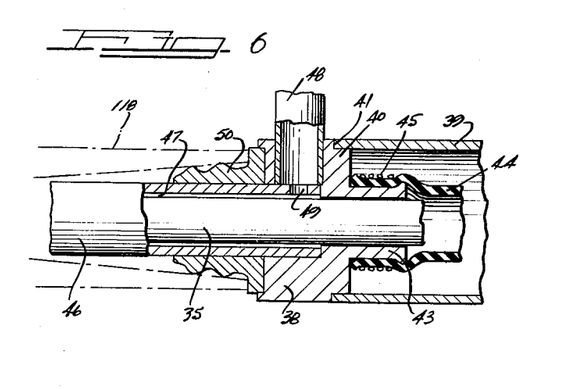
FIGURE 6 is a fragmentary enlargement of the right central portion of FIGURE 4.

As stated above, a different form of adaptor assembly from that indicated by numeral 17 in FIGURES 1 and 1a, is needed for the testing of an instrument body when that body is in one piece. There will, of course, be a series of adaptor assemblies of different sizes, different lengths, etc., one each for the bodies of flutes, clarinets, saxophones, etc., as well as for each different size of the same type of instrument. In FIGURES 4, 5 and 6 we have illustrated an adaptor assembly suitable for the testing of a wind instrument body and other adaptor assemblies for the testing of instrument bodies will differ from the one illustrated substantially only as to size.

The adaptor assembly includes a metallic base plug 32 which is externally threaded and provided with a central bore therethrough. This base plug is fixedly and firmly connected to a mounting plate 33 by means of inside and outside lock nuts 34. The mounting plate 33 is of the same type as the plate 21 in the assembly of FIGURE 1a, and it makes no difference whether the testing adaptor is disposed horizontally or vertically during use. Firmly anchored in the bore of the base plug by cementitious material or in any other suitable manner is a metallic tube 35, one end of which extends through the base plug and the aforesaid flexible tube 16 is connected to that end by means later described to supply the tube 35 with air. As best seen in FIGURE 5, the other end of the tube 35 remains open and around this end of the tube is fixed a metallic ring 36 having a maximum diameter slightly less than the bore of the instrument body or section being tested and which is also provided with a circumferential bevel at its inner end. The forward end of the ring 36 is tapered, and covered by a hollow tapering cap ring 37 to facilitate insertion of the tube in an instrument body or section.

Spaced from the fitting 32 is another centrally bored fitting 38 which is slidable along the tube 35. The fittings 32 and 38 are maintained separated by means of a metallic sleeve 39 having one end firmly connected to a nut 40 engaged with the threads on the fitting 32 inside the adjacent lock nut. The other end of the sleeve 39 is connected to the fitting 38 in a manner to cause the fitting to slide along the tube 35 without rotating whenever the sleeve 39 is rotated. One manner of making such a connection is to telescope the end of the sleeve 39 over a portion 40 of reduced diameter and against a shoulder 41 on the fitting 38. At their confronting ends, each of the fittings 32 and 38 is provided with an integral flanged nipple as shown at 43 in FIGURE 6. A flexible tube 44 of rubber or equivalent material is disposed over these nipples and secured to each in an air-tight manner by a wire winding 45 or in an equivalent manner. This flexible tube 44 prevents any air that may leak between the fitting 38 and tube 35 from escaping to atmosphere, and is under tension to maintain the shoulder 41 in engagement with the end of the sleeve 39.

At the side thereof opposite the nipple 43, the fitting 38 is recessed longitudinally to receive therein the end of a metal tube 46 which is firmly anchored to the fitting in any suitable manner. This metal tube 46 is of greater diameter than the tube 35 with which it is concentrically disposed to provide a space 47 between the tubes. A radial recess is also provided in the fitting 38 into which one end of a bent pipe 48 is anchored, this pipe extending to the end of the tube 46, and the opposite end of the pipe passing loosely through the mounting plate 33 for connection with the other of the aforesaid flexible tubes 15 whereby air may be supplied to the interior of the tube 46 through an aperture 49 in the tube opposite the end of the pipe 48. Secured to the fitting 38 and sealed around the tube 46 is a graduated resilient plug 50 which forms an air-tight seat for the end of an instrument body 118 undergoing test. Outwardly of this plug 50 the tube 46 is provided with one or more apertures 51 to permit the air to exit between the tube and the instrument body 118, the tube 46 having an outside diameter less than the diameter of the bore in the instrument body to provide sufficient passage for the air.

As seen best in FIGURE 5, the outer end of the tube 46 is covered with a ring 52 having a shank 53 of reduced diameter extending into the space 47 between the tubes 35 and 46. The outer end of the ring 52 is beveled, and between the bevels of the rings 36 and 52 a resilient O-ring 54 is positioned. Preferably the O-ring has an outside diameter of a size to fit smoothly within the bore of the instrument section. With this arrangement, rotation of the sleeve 39 and nut 40 by means of an arm or lever 40a secured to the nut will move the fitting 38 and tube 46 outwardly to compress the O-ring into airtight engagement with the inside bore of the instrument section 18, thus isolating all tone holes in that section between the O-ring and the resilient seat 50. This structure permits isolation of a portion of an instrument body immediately adjacent a tone hole as evidenced by the showing in FIGURE 4 where the O-ring seals the section in immediate proximity with the tone hole 55.

Figure 7:
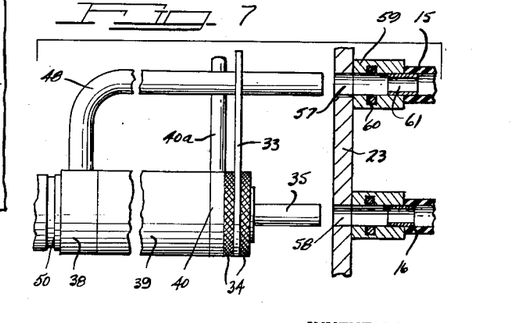
FIGURE 7 is an exploded view, fragmentary and partly in elevation and partly in section, illustrating the connection of the instrument holding means or adaptor of FIGURE 4 to the base panel of the testing apparatus.

With reference now to FIGURE 7, it will be seen that means are provided for easily and quickly connecting an adaptor with the air tubes 15 and 16. The base plate 23 is provided with a pair of apertures 57 and 58 and to the underside of this plate a tubular fitting 59 is secured in alignment with each of the apertures. Each such fitting is provided with an interior groove in which is a resilient O-ring 60. A short sleeve 61 is secured in the end of the fitting, projects outwardly therefrom, and the respective air tube 15 or 16 is slipped over this nipple. It is a simple expedient to insert the tubes 35 and 48 of the adaptor in the apertures 57 and 58 in the base plate 23 and press these tubes downwardly until they pass the O-rings, thus establishing an air-tight connection with the tubes 15 and 16.

When an instrument body is to be tested for leakage, it is a simple expedient to mount the proper adaptor on the base plate 23 with the adaptor tubes connected with the air tubes 15 and 16. The instrument body is then slipped over the adaptor, and the lever 40a is used to rotate the nut 40 and sleeve 39 a partial revolution and seal the O-ring 54 inside the instrument body and divide off a part of the body containing the tone holes controlled by one hand. The other end of the body is closed with a suitable stopper such as a rubber cork 56. When the lower part of the instrument body is under test, the above described valve means are adjusted to block air flow through the tube 16 and permit air flow through the tube 15 and adaptor pipe 48 into the space between the tube 46 and the instrument body. When the other portion of the instrument body is tested, the valve means are adjusted to close off the tube 15 and permit air to flow through the tube 16 and adaptor tube 35 into the region beyond the O-ring 54. After this part of the instrument has been tested, it is a simple expedient to again rotate the nut 40 and tube 39 by the lever 40a to release the O-ring 54 and remove the instrument body from the adaptor.

Figure 8:
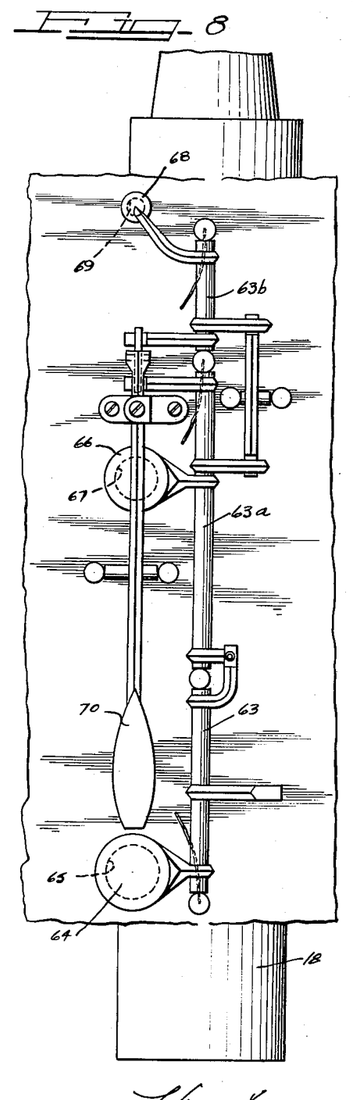
FIGURE 8 is a fragmentary elevational view of an instrument section, with a portion of the instrument body resolved into the flat for better illustrative purposes.

In order to better explain the testing of an instrument section, in FIGURE 8 we have shown an instrument section 18 which is a part of a clarinet. In this illustration there is shown only the tone holes controlled by the thumb of the musician, those controlled by the fingers being upon the opposite side of the instrument. The illustrated mechanism includes three aligned hinge rods 63, 63a and 63b which are spring actuated in a known manner. A cover 64 is connected to the hinge rod 63 and overlies a tone hole 65, namely an F sharp hole, normally open. A cover 66 connected to the hinge rod 63a normally closes a B flat tone hole 67, and a cover 68 connected to the hinge rod 63b normally closes a register hole 69. Control is effected by the use of the thumb on the cover 64 and on a spatula key 70. When the cover 64 is pressed to closed position the F sharp hole is closed, when the spatula key alone is actuated the B flat hole is opened, and when the cover 64 and spatula key are simultaneously actuated the register hole 69 is uncovered.

When undergoing test, the instrument section 18 is mounted upon the small adaptor as shown in FIGURES 1 and 1a, and the cork 18a placed in the upper end of the section. The valve means are adjusted to permit a full flow of air through the line 16. After the air has been started and the manometer liquid is at its maximum reading above the scale 2, the key mechanism on the instrument section is manipulated so that all tone holes are closed. Should the section be entirely free of leakage, the liquid level in the manometer will rapidly drop and remain at zero or the selected comparison standard reading. Should leakage appear, however, the manometer liquid will drop to a lower reading at some point above zero. That reading will be proportional to the amount of leakage in the instrument section.

Upon noting the occurrence of leakage, the operator will then use his free hand to individually manipulate the tone hole covers. That is the operator will press the covers tightly over the respective tone holes, one at a time, at the same time watching the manometer. Should the manometer liquid drop further, a point of leakage has been ascertained and the respective tone hole cover or pad therein can be properly adjusted, and the difference between the reading before and after the particular tone hole pad has been forced over the hole denotes the proportional amount of leakage at that point. Thus the degree or amount of corrective effort necessary at the leakage point is made clear to the operator. There may be more than one leakage point, but as the test proceeds with the keys or mechanism illustrated as well as with the tone holes controlled by the fingers, not shown in the drawings, another drop may be noted on the manometer betraying another point of leakage and also indicating the amount of corrective effort necessary to compensate for it.

When an instrument body is to be tested, it is mounted on the form of adaptor shown in FIGURES 4, 5, 6 and 7, the O-ring 54 tightened to seal off a part of the body, and the stopper 56 placed in the outer end of the body. Air is admitted by operation of the valve means to one part of the instrument body at a time and the test proceeds in the manner above outlined in connection with the section 18.

It should also be noted that leakage sometimes occurs at the joint between two instrument sections, and this can also be ascertained with the aid of the instant invention. Two sections may be joined, and slipped over an adaptor of the type shown in FIGURE 4 as a unit. The adaptor, however, should be of such length that the O-ring is disposed on one side of the joint. Air is then admitted to the interior of the joined sections on the other side of the joint, all of the keys or tone hole covers are held tightly closed to insure no leakage there, and should there be a reading on the manometer leakage at the joint would be determined as well as the proportional amount indicating what adjustment is necessary to correct for that leakage.

The arrangement also makes it possible to test the adjustment of the bridge mechanism which extends over the joint for the manipulation of tone hole covers on one side of the joint by keys on the opposite side. With clarinet sections for example, the left-hand middle finger hole of a section could be corked, the other normally open holes could be held closed, and the keys actuated by the bridge mechanism can be manipulated to ascertain if the necessary adjustment may be in the bridge mechanism itself.

It is therefore apparent that the instant invention may be utilized to rather completely test a musical instrument of the wind variety for leakage and at the same time indicate what portion of the mechanism needs adjustment and the amount of adjustment necessary.

Figure 9:
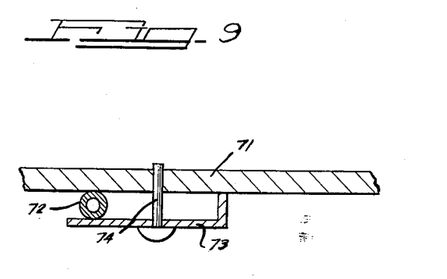
FIGURE 9 is a fragmentary plan sectional view of a modified adjustment means for a portion of the apparatus.
Figure 10:
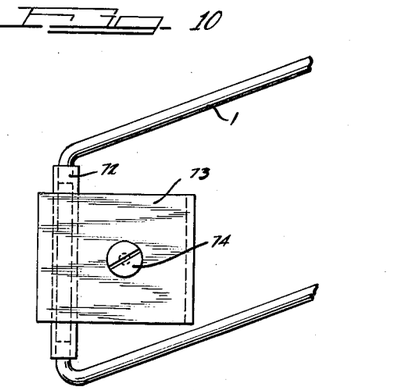
FIGURE 10 is a fragmentary elevational view of the structure of FIGURE 8.

In FIGURES 9 and 10 we have illustrated a modified mechanism for compensating for any irregularity that might occur to the initial liquid level, if for some reason a movable manometer scale is not desirable. In this instance, the compensating means may be mounted on a backing 71 which may also carry the manometer tube and scale. The legs of the manometer tube 1 are separated at the vertical connection therebetween and a flexible tube 72 substituted for the solid connection seen in FIGURE 1. An angular plate 73 with the short leg thereof abutting the backboard and the longer leg overlying the flexible connection 72 may be adjusted by means of a screw 74 extending through the plate and engaged in the backboard. By turning this screw, the flexible connection 20 may be compressed or released to its full size as may be required and thus change the liquid level in the upper manometer leg until it coincides with the zero reading on the scale. It makes no difference that the volume of liquid in the flexible tube connection 20 is changed when the angle plate is adjusted since this tube has a greater volume per inch length than does the manometer tube 1 and also the amount of liquid in that particular portion of the manometer will have no bearing on the accuracy of the readings.

Figure 11:
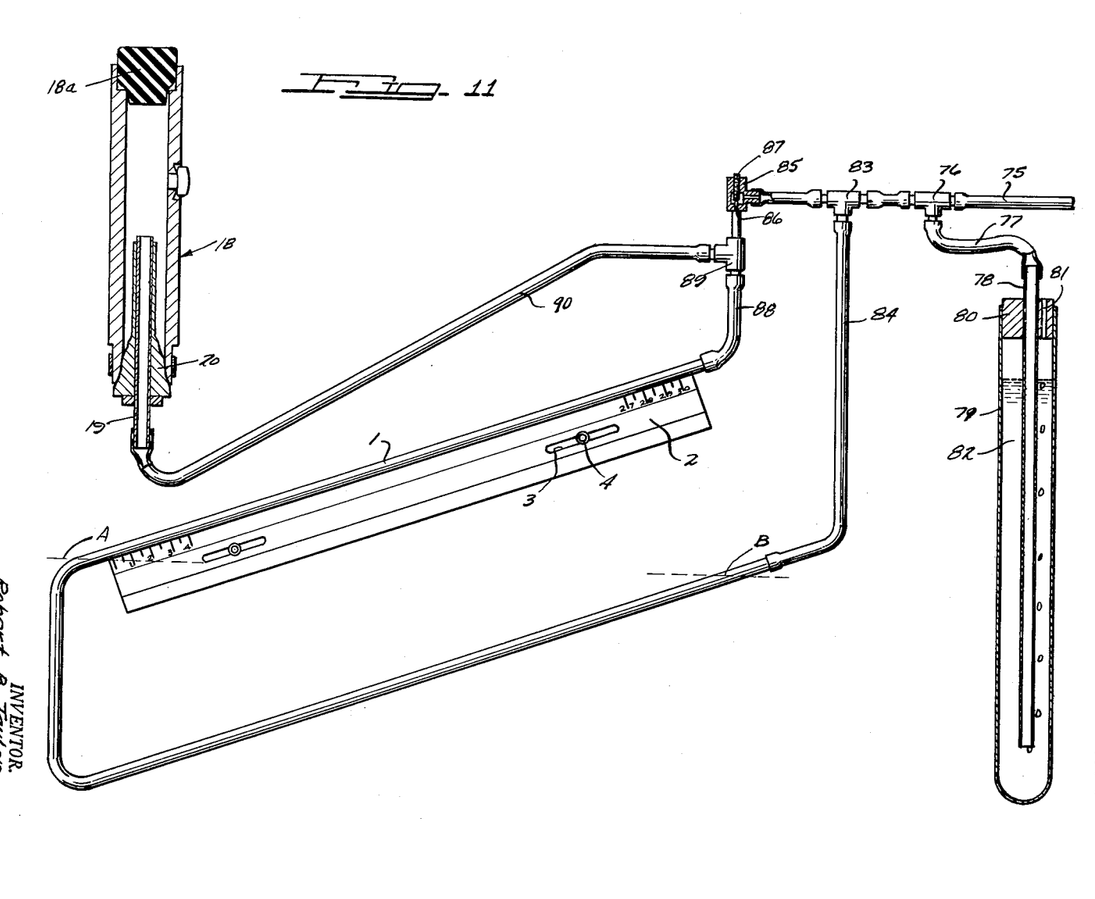
FIGURE 11 is a fragmentary view of the same character as FIGURE 1 illustrating a simplified form of the instant invention.

In order to more fully illustrate the instant invention in FIGURE 11 we have shown a simplified form of the apparatus which is readily constructed, and occupies very little space. This simplified structure embodies the basic principles of operation of the apparatus and, as is the case with the previously described embodiments, similar arrangements may be made in tandem to be supplied from a single air line, if so desired.

In this instance, we have shown the same manometer tube 1 with the scale 2 thereon as above described, and we have also utilized the simple form of adaptor or test piece mounting including the tube 19 and the resilient sealing seat 20 as previously described in connection with the showing of FIGURE 1a. Of course, any equivalent manner of connecting an air line to the test piece may be utilized, it only being necessary to admit air under pressure into the interior of the test piece 18 plugged as indicated at 18a in order to determine whether or not leakage is present and if present approximately how much leakage.

In this instance, air is admitted through a supply line 75. By way of a T 76 and tube 77 a connection is made to the supply line with a simplified form of pressure regulating means. The pressure control or regulator includes a rigid tube 78 which extends into a large tube 79 in the nature of a test tube and which is preferably transparent. The test tube is plugged at its upper end as indiacted at 80, and the plug is provided with a vent opening 81. The test tube is filled with a quantity of water 82 and the initial level of the water is such that when the rigid tube 78 is inserted in the test tube there will be a depth of water inside the rigid tube approximating 7½ inches at the start of the operation. The pressure in the line 75 may be adjusted by any suitable means so that the water is forced out of the rigid tube 78 and air bubbles appear in the water surrounding the tube, whereby a pressure in the supply line is maintained at the satisfactory level of approximately 7½ inches of water. This particular pressure is not essential, but is a satisfactory operating value.

As in the previous embodiment, the line 75 provides much more air than is required for the testing of an instrument part. On the downstream side of the T 76 the supply line is connected at full capacity to the lower leg of the manometer by way of a T 83 and the tube 84. Downstream of the T 83 is a volume reduction valve 85 connected in the supply line, this valve being of the same character as the valve 11 described in connection with FIGURE 1. As seen best in FIGURE 11, the valve body is provided with an orifice 86 and this is controlled by a reduced end portion on a set screw 87. In effect, this valve is an adjustable orifice for volume control and is adjusted to pass a greatly reduced volume of air in comparison with that passing through the tube 84 to the lower leg of the manometer. From the valve a connection is established through a tube 88 to the upper leg of the manometer which is provided with the greatly reduced volume of air. From a T 89 in the tube 88 a tube 90 leads to the test piece mounting, the same volume of air passing through this tube 90 as enters the upper leg of the manometer. With a considerably less volume of air supplied to the upper leg and the test piece than is supplied to the lower leg of the manometer, it will be seen that there will be a marked reduction of pressure on the liquid in the upper leg of the manometer in the event there is leakage in the instrument part being tested.

From the foregoing, it wil be apparent that we have provided a simple but accurate form of testing apparatus for musical instruments and sections thereof, as well as a quick and easily practiced method of testing such instruments and sections. The testing is accomplished quickly, accurately, economically, and not only denotes the point of leakage, but the relative amount of leakage at each and every point where it may occur and the degree of adjustment necessary to correct for leakage.

It will be understood that modifications and variations may be effected without departing from the scope of the novel concepts of the present invention.

We claim as our invention:

1. In apparatus for testing wind instruments and sections thereof for leakage, a manometer, a compressed air line connected to both legs of the manometer tube, a volume control valve in said line in advance of its connection to one of said legs, a test unit comprising a pair of concentric tubes, seating means associated with the outer of said tubes for positioning an instrument section thereover and spaced therefrom in an airtight manner, means for moving one tube relatively to the other, sealing means responsive to the movement of said one tube to seal off a portion of the instrument section around the outer tube, a separate air supply line for the inner tube and for the space between the outer tube and instrument section, valve means for selectively controlling air flow through said separate air lines, and a connection from both said separate air lines to said one leg of the manometer tube.

2. In apparatus for testing wind instruments and sections thereof for leakage, a manometer, a compressed air line connected to both legs of the manometer tube, a volume control valve in said line in advance of its connection to one of said legs, a test unit comprising a pair of concentric tubes, seating means associated with the outer of said tubes for positioning an instrument section thereover and spaced therefrom in an airtight manner, said outer tube having an opening therein on each side of said means, an air line leading to one of said openings whereby air is supplied to the space between said outer tube and the instrument section, means to seal off a predetermined portion of said instrument section around said outer tube, a plug for the outer end of said section, an air line leading to said inner tube, valve means to selectively control air flow through the last said air lines, and a connection from both the last said air lines to said one leg of the manometer tube.

3. In apparatus for testing wind instruments and sections thereof for leakage, a pair of concentric tubes over the outer of which the test piece is telescoped, a sealing seat on said outer tube to receive one end of the test piece, a pair of separate air lines one leading to each of said tubes, means to seal off a portion of the test piece to air from the outer tube, the inner tube extending beyond said means, a plug in the end of the test piece whereby the other portion thereof receives air from the inner tube, and control means to selectively govern air flow through said air lines.

4. In apparatus for testing wind instruments and sections thereof for leakage, a pair of concentric tubes over the outer of which the test piece is telescoped, a sealing seat on said outer tube to receive one end of the test piece, a pair of separate air lines one leading to each of said tubes, means to seal off a portion of the test piece to air from the outer tube, the inner tube extending beyond said means, a plug in the end of the test piece whereby the other portion thereof receives air from the inner tube, control means to selectively govern air flow through said air lines, and indicating means connected to said air lines to denote if leakage occurs in either portion of the test piece.

5. In apparatus for testing wind instruments and sections thereof for leakage, a tube over which an instrument may be telescoped with a space therebetween, a sealing seat around the tube for one end of the instrument, means associated with said tube to seal off a predetermined length of the instrument, an air line connected to said tube to pass air into said space, a second tube extending through the first tube and beyond said sealing off means, a plug for the instrument beyond said sealing off means, an air line connected to said second tube, and pressure indicating means connected to said air lines.

6. In apparatus for testing wind instruments and sections thereof for leakage, mounting means for an instrument section, separate air lines leading to said mounting means, sealing means for both ends of the instrument section and also at an intermediate portion of the section to seal off separate parts of the section, connections from said air lines one to each of the sealed off parts of the section, and pressure indicating means connected to said air lines.

7. In apparatus for testing wind instruments and sections thereof for leakage, mounting means comprising a plurality of concentric tubes of different lengths, sealing means for both ends of the instrument section, sealing means to seal off parts of the section each part being supplied with air from a separate tube, a separate air line for each tube, and pressure indicating means connected to said air lines.

8. In apparatus for testing wind instruments and sections thereof for leakage, a pair of concentric tubes, a sealing seat for an instrument section telescoped over the outer tube, confronting end members on said tubes, a sealing ring between said end members, means to move one of said tubes axially relatively to the other to compress and release said sealing ring which when under compression seals off a portion of the instrument section between itself and said sealing seat outside the outer tube, means to plug the end of the section, a separate air line for each tube, and pressure indicating means connected to said air lines.

9. In apparatus for testing wind instruments and sections thereof for leakage, a support, a base fitting connected to said support and having an externally threaded portion, a tube fixed in said fitting, a second fitting slidable on said tube, a nut on the threaded portion of said base fitting, a sleeve fixed to said nut and connected to said second fitting for rotary movement relatively thereto to move said second fitting along said tube when the sleeve is rotated, flexible means sealing off the space around said tube between said fittings, a second tube concentric with said fixed tube connected at one end to said second fitting, a sealing seat around said second tube for the end of an instrument section telescoped over said tubes, confronting end members on said tubes, a sealing ring between said end members compressed and released upon movement of said second tube relatively to the first tube to seal off a portion of the instrument section around the second tube, means to plug the outer end of the instrument section, an air line connected to said second fitting and said second tube to supply air to the sealed off portion of the instrument, an air line connected to the first said tube to supply air to the portion of the instrument section beyond said sealing ring, and pressure indicating means connected to said air lines.

10. In apparatus for testing wind instruments and sections thereof for leakage, a pair of concentric tubes of which the inner is longer, a sealing seat around the outer tube for the end of an instrument section telescoped over said tubes, there being a space between the outer tube and the instrument section, reversely and forwardly extending confronting members on the ends of the inner and outer tubes respectively, a sealing ring between said members, means to move one tube relatively to the other to selectively compress said ring into and release it from sealing engagement with the instrument section, means to plug the end of the instrument section beyond said ring, an air line to supply air to said space, an air line to supply air through the inner tube to the instrument section portion beyond said ring, and pressure indicating means connected to said air lines.

11. The method of testing for leakage a wind instrument section having tone holes therein and means controlling air flow through each tone hole, including the steps of sealing both ends of the instrument section, the seal being around an air line at one end, admitting compressed air into the section, actuating the control means so all tone holes are closed, checking for leakage, and if leakage occurs separately manipulating the control means for each tone hole to determine the location of the leakage.

12. The method of testing for leakage a wind instrument body having tone holes therein and means controlling air flow through each tone hole, including the steps of sealing off around an air line a portion of the instrument body containing tone holes controlled by one hand of the operator, plugging the instrument body beyond the sealed off portion, admitting compressed air into one portion of the body, actuating the control means so all tone holes in said one portion are closed, checking for leakage, and if leakage is present individually operating the control means for each tone hole to determine the location of leakage, and then repeating the operation for the other portion of the body.

13. The method of testing a pair of joined wind instrument sections having tone holes therein and means for controlling air flow through the tone holes for leakage at the joint, including the steps of sealing off an end of one section around an air line, sealing off the other section beyond the joint between sections, admitting compressed air into the sealed off portion of the joined sections, maintaining all tone holes in the sealed off portion closed, and checking for leakage at the joint between sections.

References Cited in the file of this patent

UNITED STATES PATENTS

| | | |
|---|---|---|
| 2,342,616 | O'Brien | Feb. 22, 1944 |
| 2,533,712 | Campbell | Dec. 12, 1950 |
| 2,983,137 | Lombard | May 9, 1961 |

FOREIGN PATENTS

| | | |
|---|---|---|
| 685,416 | France | Mar. 31, 1930 |